United States Patent [19]

Blackburn et al.

[11] 4,346,341
[45] Aug. 24, 1982

[54] METHOD AND APPARATUS FOR AUTOMATIC VOLTAGE REDUCTION CONTROL

[75] Inventors: Richard D. Blackburn; Donald A. Duclos, both of Pittsfield, Mass.

[73] Assignee: General Electric Company

[21] Appl. No.: 239,696

[22] Filed: Mar. 2, 1981

[51] Int. Cl.³ .............................................. G05F 1/14
[52] U.S. Cl. .................................. 323/257; 361/18; 361/65
[58] Field of Search ............................... 323/255–258, 323/260, 274, 341; 361/63–66, 79–80, 93–94, 83, 107, 18, 87

[56] References Cited

U.S. PATENT DOCUMENTS 3,039,253  6/1962  Van Hoesen et al. .......... 323/256 X
3,226,628 12/1965  Kupferberg et al. ................ 323/257
3,725,771  4/1973  Gilmore .............................. 323/257

*Primary Examiner*—William M. Shoop
*Assistant Examiner*—Peter S. Wong
*Attorney, Agent, or Firm*—Robert A. Cahill

[57] ABSTRACT

Automatic voltage reduction is provided by a voltage regulator by monitoring utility load currents and comparing the load currents to a predetermined current value. When the predetermined current value is exceeded, the voltage input to the voltage regulator control is increased by a fixed predetermined amount causing the voltage regulator output to decrease. One embodiment of the automatic voltage reduction control circuit utilizes a current transformer for receiving a signal from a utility line in proportion to the amount of line load current. The current signal is compared to a predetermined current value by means of a differential amplifier to determine when the predetermined current is exceeded. The differential amplifier output then operates a relay to connect an auxiliary voltage source in series with the sensing transformer within the voltage regulator control unit.

2 Claims, 2 Drawing Figures

METHOD AND APPARATUS FOR AUTOMATIC
VOLTAGE REDUCTION CONTROL

BACKGROUND OF THE INVENTION

Voltage regulators can be employed to reduce utility system peak loads by reducing the load voltage. Methods currently available for reducing peak loading range from manually adjusting the voltage regulator to sophisticated radio control techniques.

The inefficiency involved in manually adjusting voltage regulators to decrease load voltage and the economics involved with radio control devices make both systems infeasible when a plurality of voltage regulators are employed and extensive power transmission lines are involved.

The purpose of this invention is to provide apparatus and methods for automatically reducing utility system load voltage when the utility line current exceeds a predetermined set point.

SUMMARY OF THE INVENTION

A line current transformer is connected with a utility transmission line to sense line current under varying load conditions. The sensed current is compared within a threshold detector circuit to determine when a fixed current set point is exceeded. The output of the detector circuit is connected to an auxiliary power supply and relay arrangement for changing the sensing voltage to the voltage regulator control thereby causing the voltage regulator output to decrease.

DESCRIPTION OF THE PREFERRED EMBODIMENT

Figure 1:
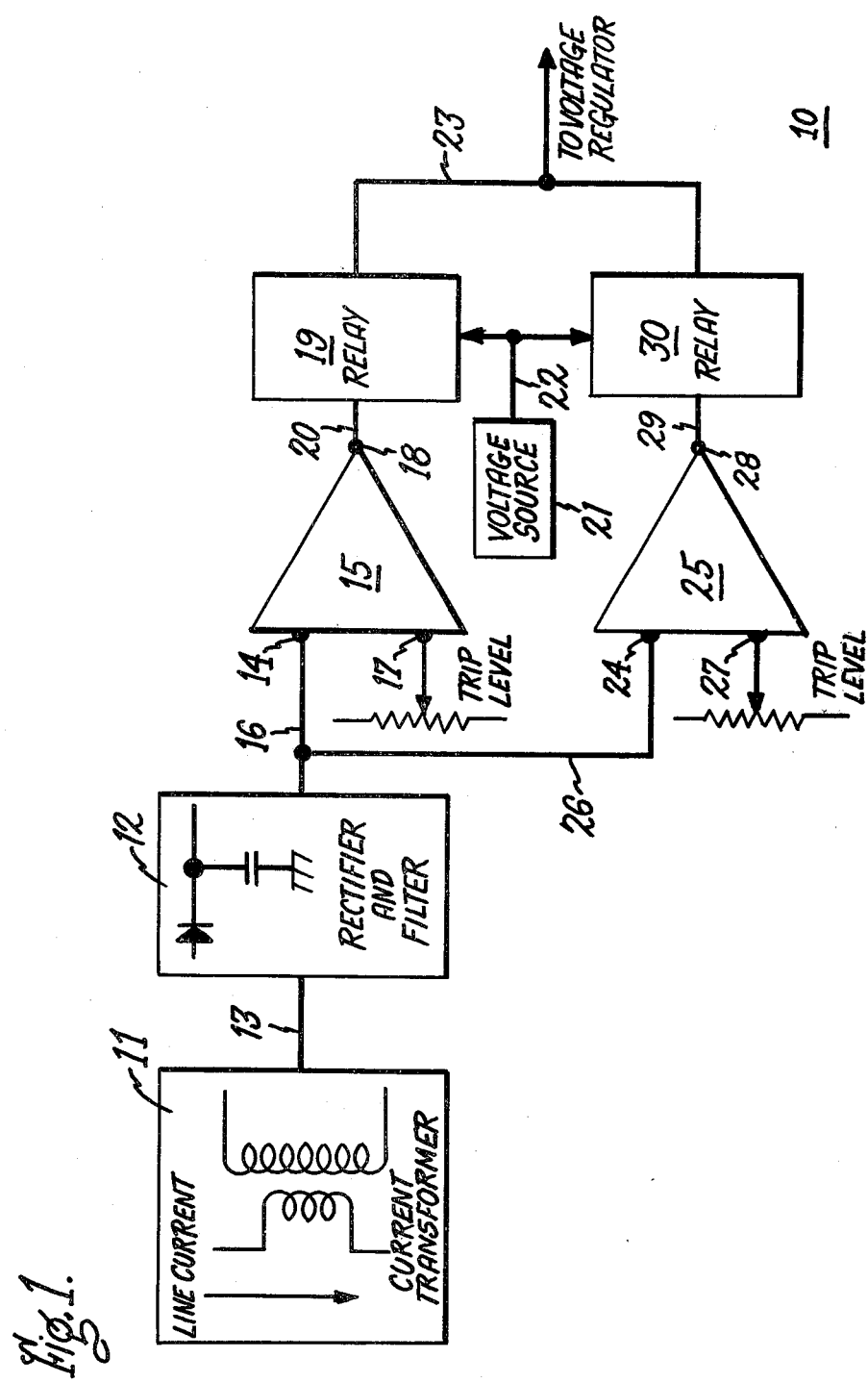
FIG. 1 is a schematic representation of the automatic voltage reduction control system according to the invention.

U.S. Pat. Nos. 3,641,546 and 4,063,148 describe state-of-the-art voltage regulator circuits and are incorporated herein for purposes of reference. The automatic voltage reduction control circuit 10 of FIG. 1 is used with a voltage regulator, of the type described within the aforementioned patents, for the purpose of reducing the voltage output from the voltage regulator in the following manner. A current transformer 11 adapted to sense utility load current on a transmission line provides a signal to a rectifier and a filter to change the current signal to DC and remove any harmonic components. The DC current signal is applied to one input 14 of a first differential amplifier 15 by means of conductor 16 for comparison with a predetermined current signal which is applied to the other differential amplifier input 17. When the sensed DC current within first amplifier 15 exceeds the predetermined current value, an output signal appears on output 18 and is transmitted to a first relay 19 by means of conductor 20 to close the relay and cause a voltage from voltage source 21 to become transmitted by means of conductors 22 and 23 to the input of a voltage regulator control. The input voltage to the voltage regulator control immediately causes the voltage regulator to decrease the output voltage that appears across the load. For closer control over the voltage appearing across the load, the sensed current signal appearing at input 14 of first differential amplifier 15, is connected to input 24 of a second differential amplifier 25 by means of conductor 26. The sensed signal is compared to a predetermined current value applied to the other input 27 of second differential amplifier 25. The current signal applied to input 24 is compared to the predetermined current value set at input 27 and an output signal occurs at output 28 if the signal at input 24 exceeds the predetermined current value. The output signal of second differential amplifier 25 is in turn connected to a second relay 30 by means of connector 29 for switching a voltage between voltage source 21 and the input terminal of the voltage regulator control.

Figure 2:
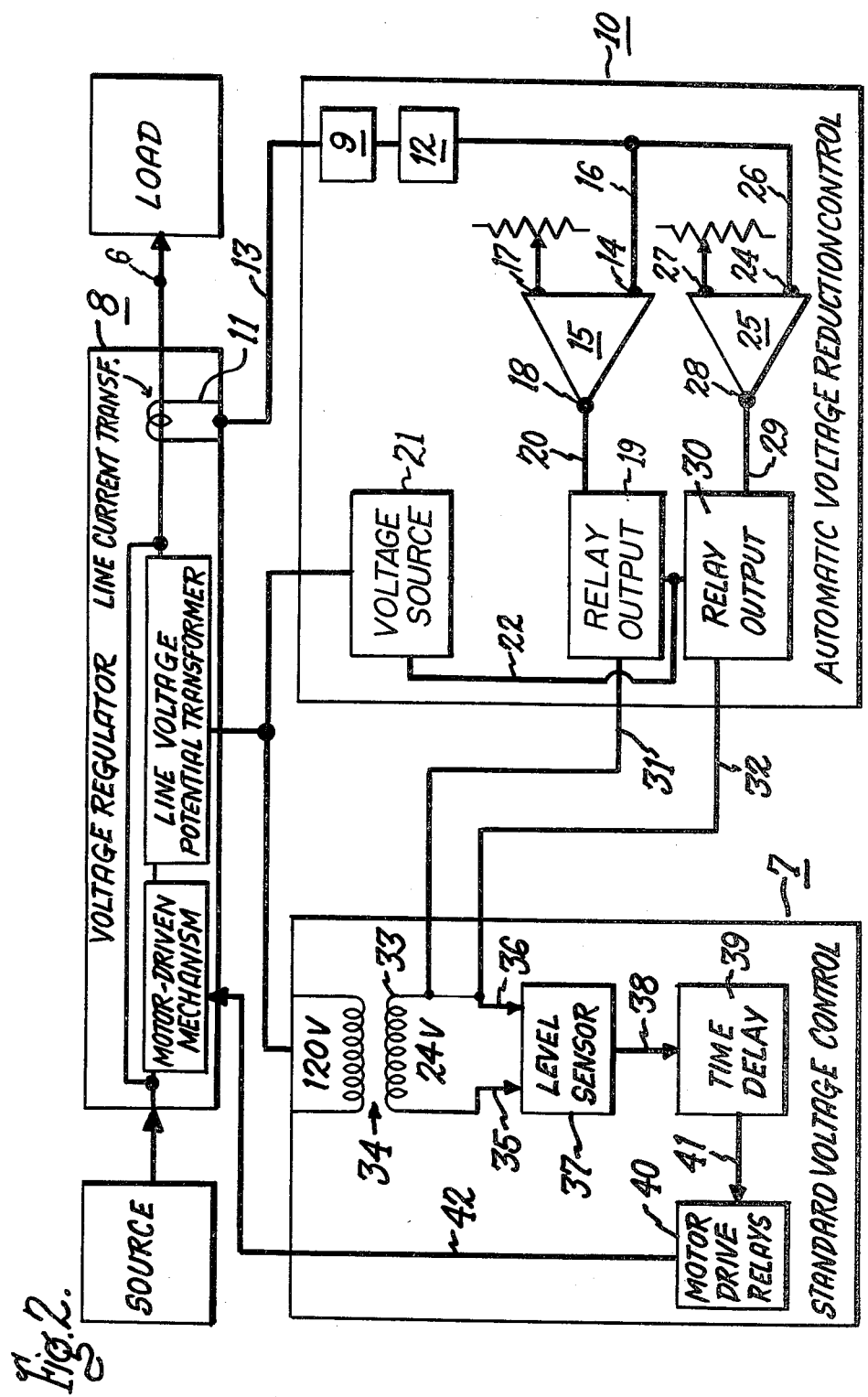
FIG. 2 is a schematic representation of the automatic voltage reduction control circuit of FIG. 1 connected with a voltage regulator and with a utility transmission line.

The interconnection between the voltage reduction circuit 10 of FIG. 1 and a voltage regulator 8 is shown in FIG. 2. The current sensing transformer 11 is magnetically coupled with a utility transmission line 6 which is connected between a source and a load as shown. Current transformer 11 is connected with a step-down transformer 9 by means of conductor 13 and the output of transformer 9 is connected to a filter network 12. The output of filter network 12 is connected to a first terminal 14 of first differential amplifier 15 by conductor 16, and to first terminal 24 of second differential amplifier 25 by means of conductor 26. Second terminal 17 of first differential amplifier 15 is connected to a current source for adjusting to a predetermined set current value. First differential amplifier 15 is connected at output 18 to first relay 19 by means of conductor 20, and output 28 of second differential amplifier 25 is connected to second relay 30 by means of conductor 29. Power supply 21 connected to the line voltage potential transformer within the circuit of voltage regulator 8 provides power through relays 19 and 30 by means of electrical connector 22. The output of relay 19 s connected to the secondary winding 33 of step-down transformer 34 by means of conductor 31 and the output of relay 30 is connected to the secondary of step-down transformer 34 by means of conductor 32. The output of step-down transformer 34 is connected to a level sensor 37 by means of conductors 35 and 36. The output of level sensor is connected by means of conductor 38 to a time delay 39. The output of time delay 39 is connected to motor drive relays 40 by means of conductor 41 which operates the motor drive mechanism within voltage regulator 8 by means of electrical conductor 42. The current sensed at line current transformer 11, therefore, operatively functions to provide a voltage increase to voltage regulator control 7 causing the output from voltage regulator 8 to decrease and, in turn, decrease the line load current.

What is claimed as new and which it is desired to secure by Letters Patent of the United States is:

1. A voltage reduction control circuit for utilization in conjunction with a conventional voltage regulator normally operating to regulate the line voltage in a power distribution circuit, wherein said voltage regulator includes a potential transformer having a primary connected with the distribution circuit and a secondary in which is developed a voltage signal indicative of the line voltage, and a motor-driven mechanism operating to effect incremental reductions in the line voltage in response to increases in said control voltage and incremental increases in the line voltage in response to decreases in said control voltage, said voltage reduction control circuit including, in combination:

a current transformer linked with the distribution circuit for developing a first signal indicative of the load current flowing therein;

means for monitoring said first signal with respect to a reference signal indicative of a predetermined peak load current level, said monitoring means generating an output signal when said first signal exceeds said reference signal;

a voltage source; and switching means connected in circuit between said voltage source and the potential transformer secondary of the voltage regulator, said switching means operating in response to said output signal to connect said voltage source in circuit with the potential transformer secondary and thus effect a step voltage increase in said voltage signal, whereby the motor-driven mechanism responds as though to a high line voltage condition by effecting a reduction in the line voltage to thereby decrease the load current to a level below said predetermined peak load current level.

2. The voltage reduction control circuit of claim 11, which includes plural means for monitoring said first signal with respect to separate signals indicative of predetermined, different peak load current levels and for generating separate output signals as said first signal exceeds each said reference signal, and said switching means operating in response to said output signals to effect plural step voltage increases in said voltage signal, each said step voltage increase causing the motor-driven mechanism to effect a further decrease in the line voltage.

* * * * *